US005584528A

United States Patent [19]

Cozzani

[11] Patent Number: 5,584,528

[45] Date of Patent: Dec. 17, 1996

[54] METHOD OF ADJUSTING AN ADJUSTABLE CATCH OR STOP WITHIN A SYSTEM OF ADJUSTABLE CATCHES OR STOPS

[75] Inventor: Henri Cozzani, Conflans Ste Honorine, France

[73] Assignee: ITW De France, Beauchamp, France

[21] Appl. No.: 563,433

[22] Filed: Nov. 24, 1995

Related U.S. Application Data

[62] Division of Ser. No. 272,392, Jul. 20, 1994, abandoned.

[30] Foreign Application Priority Data

Jul. 20, 1993 [FR] France .................................. 93-08900

[51] Int. Cl.[6] .................................................... B62D 25/10

[52] U.S. Cl. ............................ 296/207; 180/69.2; 16/82; 248/188.2; 248/548; 248/909

[58] Field of Search ................................ 16/272, 392, 82; 296/76, 106, 146.1, 207; 49/392, 393; 248/188.2, 544, 548, 649, 900, 909; 180/69.2; 52/126.1; 254/104, 42

[56] References Cited

U.S. PATENT DOCUMENTS

| | | | |
|---|---|---|---|
| 2,123,484 | 7/1938 | Mafera | 254/104 |
| 2,709,571 | 5/1955 | Mafera | 248/188.2 X |
| 3,030,730 | 4/1962 | Costar | 248/188.2 |
| 3,071,887 | 1/1963 | Von Arb | 254/104 X |
| 3,171,632 | 3/1965 | Jines | 254/104 |
| 3,799,484 | 3/1974 | Muller et al. | 248/188.2 |
| 3,927,853 | 12/1975 | Guth | 248/188.2 |
| 4,569,169 | 2/1986 | Madray | 52/126.1 |
| 4,776,548 | 10/1988 | Bezenek | 248/188.2 |
| 4,805,358 | 2/1989 | Fork | 254/104 X |
| 5,112,186 | 5/1992 | Katz | 248/649 X |
| 5,249,767 | 10/1993 | Mellen | 248/188.2 |
| 5,314,160 | 5/1994 | Larsen | 248/547 |

FOREIGN PATENT DOCUMENTS

| | | | |
|---|---|---|---|
| 2565649 | 12/1985 | France . | |
| 2632576 | 12/1989 | France | 296/207 |
| 2643033 | 8/1990 | France . | |
| 2705308 | 11/1994 | France | 296/207 |
| 1247577 | 8/1967 | Germany | 248/188.2 |

*Primary Examiner*—Dennis H. Pedder
*Attorney, Agent, or Firm*—Schwartz & Weinrieb

[57] ABSTRACT

The catch (1) includes a plate (2 ) and a block (3 ) slidably mounted on the plate, which is connected by a strip (20) to a handle (19) so that the block (3) can be slidably adjusted with respect to the plate (2) by pulling on the handle (19) whilst the plate (2) is held in position.

The system includes such a catch, adapted so that the handle is accessible in a predetermined position in which the stop surfaces have to come together, and in which the remainder of the system is inaccessible.

The method provides that the position of the stop surface (16) is adjusted by pulling on the handle (19) until the stop surface (16) on the catch is brought into contact with the stop surface with which it has to interact.

18 Claims, 2 Drawing Sheets

METHOD OF ADJUSTING AN ADJUSTABLE CATCH OR STOP WITHIN A SYSTEM OF ADJUSTABLE CATCHES OR STOPS

This application is a division, of application Ser. No. 08/272,392, filed Jul. 20, 1994, now abandoned.

FIELD OF INVENTION

The present invention relates to systems of catches in which first and second stop surfaces, integral respectively with first and second members, have to come into contact when the first and second members are in a predetermined relative position.

BACKGROUND OF THE INVENTION

These systems are found notably in motor vehicles for fixing or determining the closed position of a door, bonnet or tailgate, where provision is generally made for one of the stop surfaces to have an adjustable position, because of manufacturing variations which mean that the closed position varies slightly from one vehicle to another.

Given that the system of catches is not accessible in the closed position, the operator can move the adjustable stop surface only when the corresponding members are disposed in the open position, and he must then carry out a closing maneuver to check the correct positioning of the stop surface, and if the latter is not correct, he must repeat an opening maneuver, move the surface, carry out a new check and so on until he has found the appropriate position.

The operation of adjusting the system of catches is thus a long and delicate operation which is ill-suited to the requirements of mass production.

OBJECT OF THE INVENTION

The present invention aims to make the adjustment operation simple and quick.

SUMMARY OF THE INVENTION

To this effect, it proposes a catch with an adjustable-position stop surface, characterised in that it includes:

a plate provided with fixing means;

a block slidably mounted on the plate, bearing the stop surface;

means for immobilising the block with respect to the plate; and a gripping means, and a link interconnected between the block and the gripping means, the link being connected to the block at a position such that it is possible to slide the block with respect to the plate by pulling on the gripping means whilst the plate is held in position.

By using such a catch, the gripping means of which remains when the members are disposed in the closed position, and the link passing, in the example cited above, between the vehicle body and the door or bonnet, while the plate is fixed to the body, it is only necessary to pull on the gripping means to bring the adjustable stop surface into contact with the stop surface with which it is intended to interact, for the adjustment to be made, and it is then only necessary to actuate the immobilisation means to fix the position of the block with respect to the plate.

According to preferred characteristics, the stop surface has a general orientation plane which forms an angle with the direction of sliding of the block with respect to the plate.

With these characteristics, variations in the positioning of the stop surface are obtained which are not parallel to the direction in which the block is pulled, which is particularly useful in the example cited above since the stop surface can be brought close to the block of the one with which it must come back into contact, without it being necessary to pull in a direction passing through the latter.

According to other preferred characteristics, the catch is preassembled, with the block in an extreme sliding position opposite to the extreme sliding position towards which it is drawn when the gripping means is pulled.

Thus the catch which is fixed by the plate is in a state such that in principle the stop surfaces do not come into contact in the predetermined position, so that the adjustment can be easily carried out by pulling on the gripping means.

According to other preferred characteristics, the stop includes means for creating resistance to the sliding of the block with respect to the plate.

The possibility of any spontaneous sliding of the block with respect to the plate which is liable to change the position in which they were preassembled, or to cause the adjustment position before the immobilisation of the block on the plate to be lost, is thus avoided, the resistance naturally remaining sufficiently low so as not to hinder the sliding of the block with respect to the plate when the gripping means are pulled.

According to other preferred characteristics, the connection between the link and the block is frangible.

The link and the gripping means can thus be removed when they are no longer useful, and this can be done without a special tool since it is sufficient to pull in an appropriate manner on the gripping means to break the frangible area of the link.

The fact that this area is designed to be situated at the connection between the link and the block enables the link and the gripping means to be made completely disposable, or to leave only small remnant portions thereof.

In accordance with a second aspect of the present invention, the invention concerns a system of catches in which first and second stop surfaces, integral respectively with first and second members, have to come into contact with each other when the first and second members are in a predetermined relative position, the system of catches being inaccessible when the members are disposed in the predetermined position; the system being characterised in that it includes a catch as previously disclosed, adapted so that the gripping means is accessible in the predetermined position, the adjustable-position stop surface of the catch being designed so as to form the first stop surface of the system of catches.

According to preferred characteristics, the second stop surface is borne by an elastic member mounted on the second member.

This elasticity provides useful damping in connection with the impact which occurs at the end of the closing operation, and also in connection with vibrations which are liable to occur between the first and second members when they are in the closed position.

It will be noted in this regard that it is preferable to carry out the adjustment while positioning the stop surface so that the elastic member is under stress when the members are disposed in the closed position.

According to other preferred characteristics, the first and second stop surfaces are oriented in a plane forming an acute angle with the relative direction of movement between the first and second members when they arrive at the predetermined position, the first and second members being guided with respect to each other and affording a symmetry plane, third and fourth similar stop surfaces, symmetrically opposite the first and second stop surfaces respectively, being provided in the system.

Thus the various stop surfaces converge towards the symmetrical plane, so that the system of catches provides not only retention in the direction of movement between the first and second members, but also mutual alignment of the two members and retention transverse to the direction of movement.

In accordance with a third aspect of the present invention, the invention proposes a method for assembling a system of catches in which first and second stop surfaces, fixed respectively to first and second members, come into contact when the first and second members are in a predetermined relative position, the catch system being inaccessible in the predetermined position, characterised in that:

the plate of a catch as previously disclosed is fixed to the first member, the plate being adapted so that its gripping means is accessible in the predetermined position, its adjustable-position stop surface being designed to form the first stop surface;

the first and second members are put in the predetermined position and, whilst they are held there, the gripping means is pulled until the adjustable-position stop surface is brought against the second stop surface; and the block is immobilised with respect to the plate in the position reached in the preceding stage.

According to characteristics which are preferred because of their simplicity and convenience, after adjusting the position of the stop surface, a lateral force is exerted on the gripping means in order to sever the link, which has a thin area in order to be severed in this way at its connection with the block.

BRIEF DESCRIPTION OF THE DRAWINGS

The disclosure of the invention will now be continued with the description of an embodiment, given below by way of illustration and in a way that is not limitative, with reference to the accompanying drawings in which like reference characters designate like or corresponding parts throughout the several views, and wherein.

DETAILED DESCRIPTION OF THE ILLUSTRATED EMBODIMENTS

Figure 1:
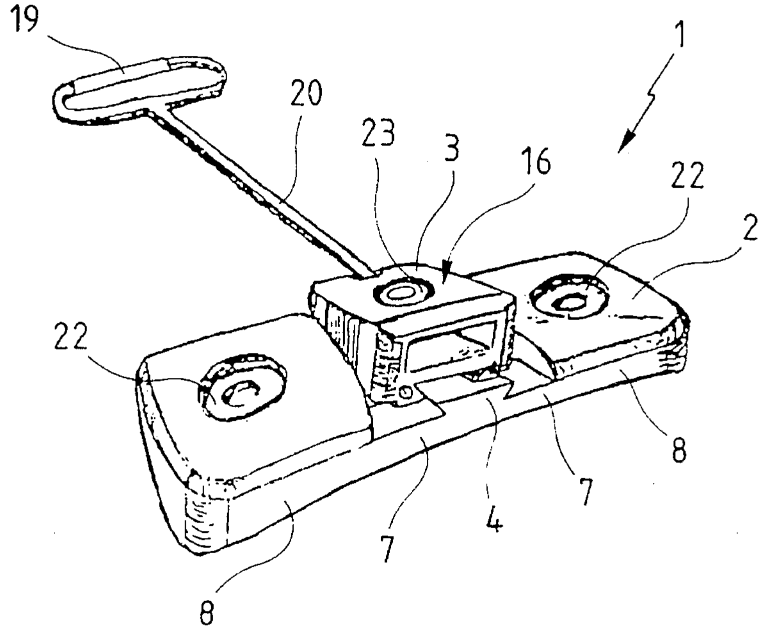
FIG. 1 is a diagrammatic perspective view of a catch constructed in accordance with the invention.

The catch 1 shown in FIG. 1 includes a plate 2 and a block 3 slidably mounted on the latter, the plate 2 and the block 3 being made of moulded plastic material.

Figure 2:
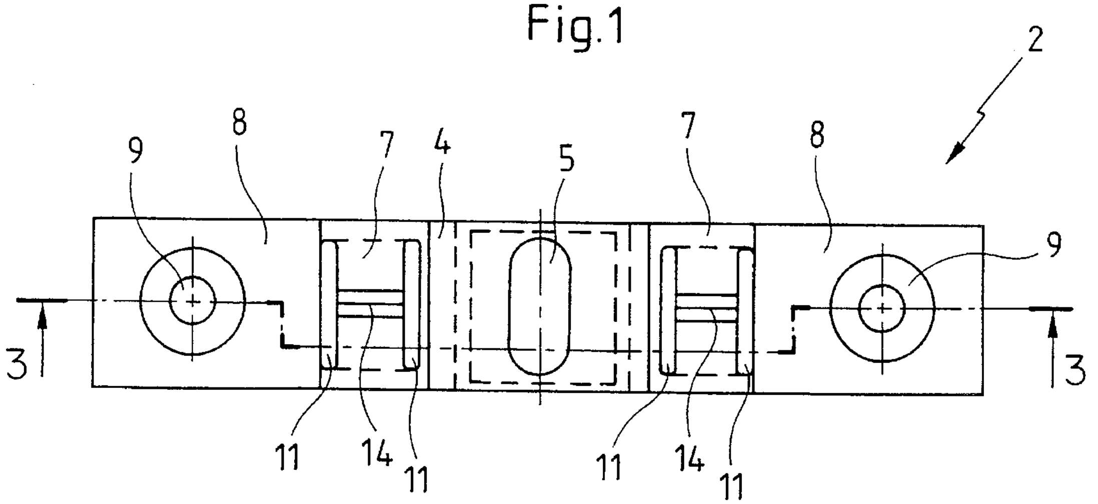
FIG. 2 is a plan view of the plate of this catch.
Figure 3:
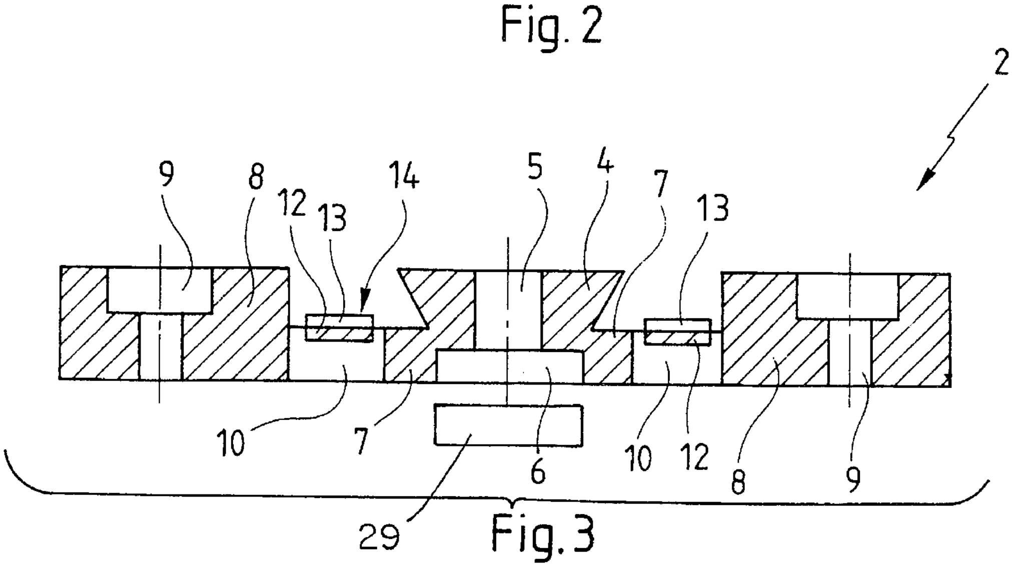
FIG. 3 is the elevational cross-section view of the plate of FIG. 2 as taken along the lines 3—3 in FIG. 2.

As can be seen more particularly in FIGS. 2 and 3, the plate 2 has at its centre a male slide 4 with a dovetail-shaped cross section, at the centre of which is provided, over practically its entire length, an oblong hole 5, the bottom part of the hole 5 opening out into a space 6 with a rectangular cross section wider than the hole 5 and having the same length.

The base of the slide 4 is connected on each side to a horizontal wall 7, the other end of which is connected to a slab 8 through which passes a countersunk hole 9 comprising two parts with different diameters, the top part having a larger diameter.

The wall 7 has a recess 10 which opens downwards, and which opens out towards the top through two oblong slots 11 between which is therefore a thinner part which forms an elongate elastic blade 12. On each of the latter, halfway between its ends, a transverse thicker part 13 with a triangular cross section is provided, the top of which forms a ridge 14 connected on each side to the rest of the top face of the blade 12 by a sloping area.

Figure 4:
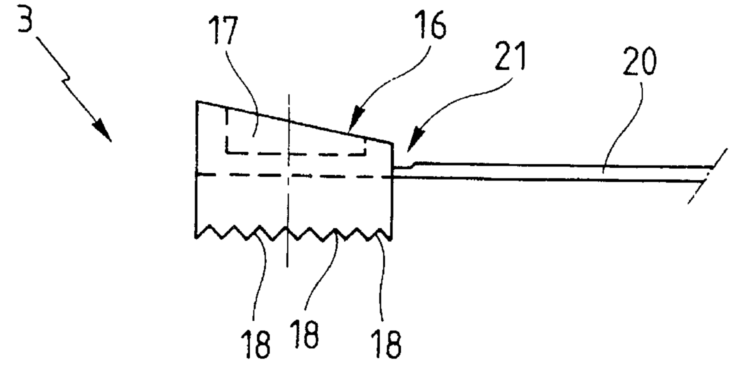
FIG. 4 is an elevation view of the block which forms part of the catch shown in FIG. 1.
Figure 5:
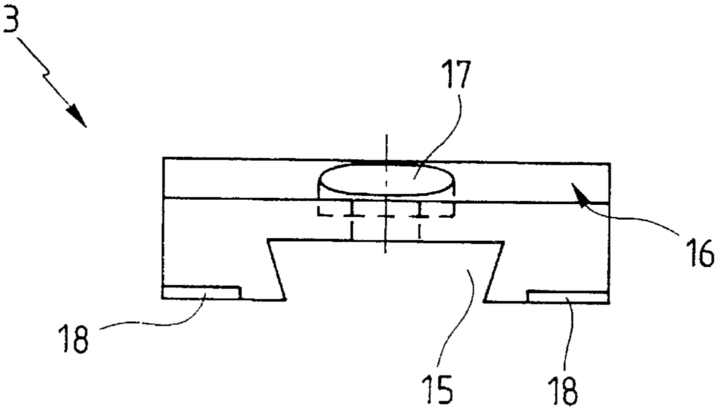
FIG. 5 is another elevation view taken from the side to the right in FIG. 4, the strip and the handle not being shown.

As can be seen more particularly in FIGS. 4 and 5, the block 3 has in its lower part a recess forming a female slide 15 with a shape corresponding to that of the slide 4, its top face 16 sloping and provided with a cylindrical hole 17 which opens out in it, and which continues downwards with a smaller diameter until it opens out into the recess 15.

On each side, the bottom face of the block 3 has a series of notches 18 with a cross section corresponding to that of the thicker part 13 of the plate 2.

A handle 19, formed here by an oval ring (see FIG. 1) is connected to the block 3 by a strip 20, which is connected to the latter by a thinner area 21, at a position centred on the symmetry plane of the slide 15 and, more generally, of the block 3.

The catch 1 is supplied preassembled with the block 3 engaged on the plate 2, the slides 4 and 15 cooperating to provide slidable mounting of the block with respect to the plate, the elastic blades 12 cooperating by means of their thicker parts 13 with the notches 18 to create resistance to the sliding of the block with respect to the plate.

It can be seen that, if the handle 19 is pulled while holding the plate 2 in place, the block 3 will then be made to slide with respect to the plate 2.

In FIG. 1, the catch 1 is shown with the block 3, which is in the extreme sliding position towards which it is drawn when the handle 19 is pulled, the catch 1 being supplied in a preassembled state in which the block 3 is placed in the other extreme sliding position.

In addition to the plate 1 and block 3, the catch 1 includes a fixing screw 22 provided in each of the holes 9 while a bolt is provided between the plate 2 and the block 3 in order to make it possible to immobilise them with respect to each other by tightening the bolt. The latter includes, more precisely, a screw 23 engaged in the hole 17 of the block 3, its threaded shank passing through the hole 5 in the plate 2, its nut 29 having a rectangular periphery with a width and thickness corresponding to those of the space 6, so that, when the block 3 slides with respect to the plate 2, the shank of the screw 3 moves in the hole 5 and the nut moves in the space 6.

The part of the catch 1 which is designed to serve as a stop surface is the top face 16 of the block 3, and it will be noted in this regard that it has an overall plane of orientation which forms an angle with respect to the direction of sliding of the block 3 with respect to the plate 2.

The catch 1 is designed to form part of a system of catches between a vehicle body 24 and a bonnet 25 mounted so as to pivot on the body 24 (see FIG. 6), the stop surface 16 of the catch 1 and the stop surface 26 of a resilient catch 27 having to come into contact with each other when the bonnet 25 is in the closed position.

To obtain this system of catches or stops the plate 2 is fixed to the body 24 with the screws 22, the bonnet 25 is brought into the closed position and is locked in it, and, although the system formed by the catches a stops 1 and 27 is generally inaccessible, it can be seen that the handle 19 remains accessible with the strip 20 which passes between the body 24 and the bonnet 25, so that by pulling on the handle 19 the block 3 can be drawn along, until the stop surface 16 is brought against the stop surface 26, and even by compressing the resilient catch 27 slightly in order to obtain a certain stressing in the closed position between the body 24 and the bonnet 25. The block 3 remains in the adjustment position because of the interaction of the catches 18 with the elastic blades 12, the final locking being obtained by immobilising the block 3 with respect to the plate 2 with the bolt 23. The system of catches is then adjusted.

To eliminate the handle 19 and the link 20, which no longer serve any purpose, a lateral force is exerted on the handle 19 in order to pull off the strip 20, the breakable area 21 of which has a thin dimension in order to be severed at this point.

Figure 6:
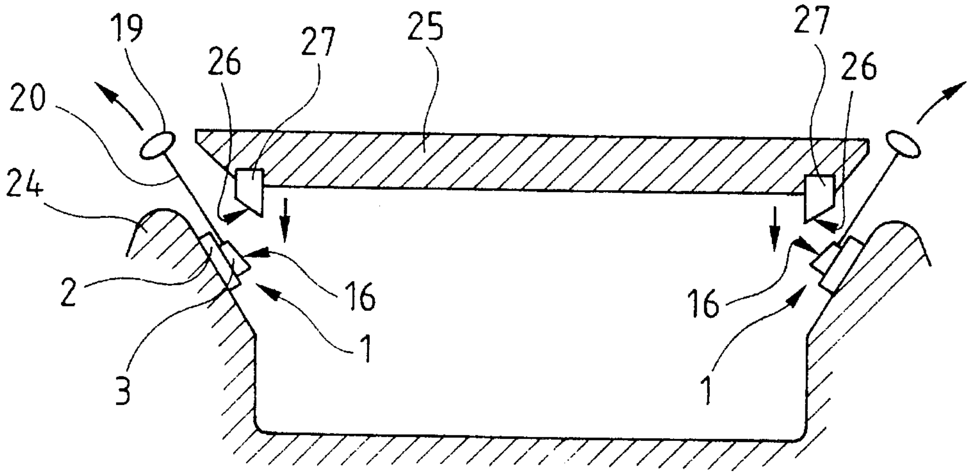
FIG. 6 is a diagrammatic elevational cross-section view showing a system of catches in accordance with the invention, including a catch as shown in the preceding figures with two symmetrically opposite positions.

In the example shown in FIG. 6, the stop surfaces 16 and 26 are orientated in a plane forming an acute angle with respect to the relative direction of movement of the body 24 and bonnet 25 when they reach the closed position, and there is, in fact, on each side, right and left, a pair of catches 1 and 27, symmetrically opposite each other, so that, on each side, contact between the body 24 and the bonnet 25 is made in a plane which intersects the symmetry plane of the assembly formed by the body 24 and the bonnet 25, the two contact planes converging at the symmetry plane, which means that not only are the bonnet 25 and body 24 stopped and locked in the direction of the relative movement, but are also centred and laterally locked with respect to each other.

It will be noted that numerous variants are possible according to circumstances, notably gripping means can be provided and a different connection of the handle 19 and strip 20, or guiding means for the sliding between the plate and the block with a cross section other than a dovetail.

Instead of being a bonnet the closing element may be a door or a tailgate; and the invention may be used in fields other than that of vehicles.

It should be stated, more generally, that the invention is not limited to the examples described and shown.

It is therefore to be understood that within the scope of the appended claims, the present invention may be practiced otherwise than as specifically described herein.

I claim:

1. A method for adjusting a stop member within a stop system comprising first and second stop members, having first and second stop surfaces defined thereon, respectively mounted upon first closure and second body members wherein said first closure member is movable with respect to said second body member between first adjacent and second remote positions whereby said stop system fixedly determines said first adjacent position of said first closure member with respect to said second body member such that when said first closure member is repeatedly moved with respect to said second body member from said adjacent position to said remote position and back to said adjacent position, the location of said first adjacent position of said first closure member with respect to said second body member is always the same, comprising the steps of:

providing said first stop member, having said first stop surface, upon said first closure member;

fixing a plate member to said second body member wherein said first closure member is movable with respect to said second body member between said adjacent position, at which portions of said first closure and second body members upon which said first and second stop members are mounted are spaced from each other and define a gap therebetween, and said remote position;

disposing a block member, comprising said second stop member having said second stop surface, upon said plate member such that said block member is slidably adjustable with respect to said plate member;

providing said block member with a gripping means which is accessible to an operator, through said gap defined between said portions of said first closure and second body members, when said first closure member is disposed at said adjacent position with respect to said second body member;

moving said first closure member relative to said second body member such that said first closure member is moved from said remote position to said adjacent position with respect to said second body member so as to define said gap therebetween; and pulling said gripping means, accessible to said operator through said gap defined between said portions of said first closure and second body members and while said first closure member is disposed at said adjacent position with respect to said second body member, so as to adjustably move said block member, comprising said second stop member having said second stop surface disposed thereon, until said second stop surface is brought into contact with said first stop surface of said first stop member disposed upon said first closure member so as to fixedly determine a stop position defined between said first and second stop surfaces of said first and second stop members so as to, in turn, fixedly determine said adjacent position of said first closure member with respect to said second body member when said first closure member is moved with respect to said second body member from said remote position to said adjacent position.

2. A method for adjusting a stop member within a stop system comprising first and second stop members, having first and second stop surfaces defined thereon, respectively mounted upon first closure and second body members wherein said first closure member is movable with respect to said second body member between first remote and second adjacent positions whereby said stop system fixedly determines said second adjacent position of said first closure member with respect to said second body member such that when said first closure member is repeatedly moved with respect to said second body member from said adjacent position to said remote position and back to said adjacent position, the location of said adjacent position of said first closure member with respect to said second body member is always the same, comprising the steps of:

providing said first stop member, having said first stop surface defined thereon, upon said first closure member;

fixing a plate member upon said second body member wherein said first closure member is movable with respect to said second body member between said remote position, and said adjacent position at which portions of said first closure and second body members upon which said first and second stop members are mounted, are spaced from each other and define a gap therebetween;

disposing a block member, comprising said second stop member having said second stop surface defined thereon, upon said plate member such that said block member is slidably adjustable with respect to said plate member in a direction extending from a first position at which said second stop member and said second stop surface thereof are remotely disengaged from said first stop surface of said first stop member disposed upon said first closure member when said first closure member is disposed at said adjacent position with respect to said second body member, and toward a second position at which said second stop member and said second stop surface thereof are adjustably engaged with said first stop surface of said first stop member disposed upon said first closure member when said first closure member is disposed at said adjacent position with respect to said second body member so as to provide a stop function with respect to said first closure member when said first closure member is disposed at said adjacent position with respect to said second body member;

providing said block mender with a gripping means which is accessible to an operator, through said gap defined between said portions of said first closure and second body members, when said first closure member is disposed at said adjacent position with respect to said second body member;

moving said first closure member relative to said second body member such that said first closure member is moved with respect to said second body member from said remote position to said adjacent position so as to define said gap therebetween; and pulling said gripping means, accessible to said operator through said gap defined between said portions of said first closure and second body members and while said first closure member is disposed at said adjacent position with respect to said second body member, so as to adjustably move said block member, comprising said second stop member having said second stop surface disposed thereon, in said direction extending from said first position to said second position so as to cause said second stop surface of said second stop member to be brought into contact with said first stop surface of said first stop member disposed upon said first closure member and thereby fixedly determine a stop position defined between said first and second stop surfaces of said first and second stop members so as to, in turn, fixedly determine said adjacent position of said first closure member with respect to said second body member when said first closure member is moved with respect to said second body member from said remote position to said adjacent position.

3. A method for adjusting a stop member within a stop system comprising first and second stop members, having first and second stop surfaces defined thereon, mounted upon first fixed body and second movable closure members for predetermining a fixed disposition of said second movable closure member with respect to said first fixed body member by providing an adjustable stop position for said second movable closure member which is to be moved from a first position remote from said first fixed body member and be disposed at a predetermined second position adjacent to said first fixed body member such that when said second movable closure member is repeatedly moved with respect to said first fixed body member from said adjacent position to said remote position and back to said adjacent position, the location of said adjacent position of said second movable closure member with respect to said first fixed body member is always the same, comprising the steps of:

providing said first fixed body member;

providing said second movable closure member which is movably mounted with respect to said first fixed body member between said first position remote from said first fixed body member and said second position adjacent to said first fixed body member at which portions of said first fixed body member and said second movable closure member are spaced from each other so as to define a gap therebetween;

providing said first stop member, having said first stop surface defined thereon, upon one of said first fixed body and second movable closure members;

fixing a plate member upon a second one of said first fixed body and second movable closure members;

disposing a block member, comprising said second stop member having said second stop surface defined thereon, upon said plate member such that said block member is slidably adjustable with respect to said plate member in a direction extending from a first position at which said second stop member and said second stop surface thereof are remotely disengaged from said first stop surface of said first stop member disposed upon said one of said first fixed body and second movable closure members when said second movable closure member is disposed at said position adjacent to said first fixed body member, and toward a second position at which said second stop member and said second stop surface thereof are adjustably engaged with said first stop member and said first stop surface thereof disposed upon said one of said first fixed body and second movable closure members when said second movable closure member is disposed at said position adjacent to said first fixed body member so as to provide a stop function for said second movable closure member when said second movable closure member is disposed at said position adjacent to said first fixed body member;

providing said block member with a gripping means which is accessible to an operator, through said gap defined between said portions of said first fixed body and second movable closure members, when said second movable closure member is disposed at said position adjacent to said first fixed body member;

moving said second movable closure member with respect to said first fixed body member from said position remote from said first fixed body member to said position adjacent to said first fixed body member so as to define said gap therebetween; and pulling said gripping means, accessible to said operator through said gap defined between said positions of said first fixed body and second movable closure members and while said second movable closure member is disposed at said position adjacent to said first fixed body member, so as to adjustably move said block member, comprising said second stop member having said second stop surface disposed thereon, in said direction extending from said first position, at which said second stop member and said second stop surface thereof are remotely disengaged from said first stop surface of said first stop member, toward said second position, at which said second stop member and said second stop surface thereof will be adjustably engaged with said first stop member and said first stop surface thereof so as to cause said second stop surface of said second stop member to be brought into contact with said first stop surface of said first stop member and thereby fixedly determine said stop position defined between said first and second stop surfaces of said first and second stop members so as to, in turn, fixedly determine said position of said second movable closure member adjacent to said first fixed body member when said second movable closure member is moved from said position remote from said first fixed body member to said position adjacent to said first fixed body member.

4. The method as set forth in claim 1, further comprising the step of:

providing said block member and said plate member with means defining a plurality of discrete positions at which said block member can be selectively adjustably positioned with respect to said plate member.

5. The method as set forth in claim 4, further comprising the steps of:

providing a plurality of flexible blade detents upon said plate member; and providing a plurality of notches upon said block member for selectively engaging said flexible blade detents of said plate member, whereby said plurality of flexible blade detents and said plurality of notches together comprise said means defining said plurality of discrete adjustable positions for said block member with respect to said plate member.

6. The method as set forth in claim 5, further comprising the step of:

providing fastening means interconnecting said block member and said plate member for fixedly securing said block member to said plate member at a selected one of said adjustable positions of said block member with respect to said plate member after said block member has been moved to said selected one of said adjustable positions with respect to said plate member.

7. The method as set forth in claim 1, further comprising the step of:

providing said gripping means with a frangible section whereupon after adjustment of said block member with respect to said plate member, said gripping means may be severed from said block member at said frangible section.

8. The method as set forth in claim 1, wherein:

said first member comprises a vehicle hood; and said second member comprises a vehicle body.

9. The method as set forth in claim 2, further comprising the step of:

providing said block member and said plate member with means defining a plurality of discrete positions at which said block member can be selectively adjustably positioned with respect to said plate member.

10. The method as set forth in claim 9, further comprising the steps of:

providing a plurality of flexible blade detents upon said plate member; and providing a plurality of notches upon said block member for selectively engaging said flexible blade detents of said plate member, whereby said plurality of flexible blade detents and said plurality of notches together comprise said means defining said plurality of discrete adjustable positions for said block member with respect to said plate member.

11. The method as set forth in claim 10, further comprising the step of:

providing fastening means interconnecting said block member and said plate member for fixedly securing said block member to said plate member at a selected one of said adjustable positions of said block member with respect to said plate member after said block member has been moved to said selected one of said adjustable positions with respect to said plate member.

12. The method as set forth in claim 2, further comprising the step of:

providing said gripping means with a frangible section whereupon after adjustment of said block member with respect to said plate member, said gripping means may be severed from said block member at said frangible section.

13. The method as set forth in claim 2, wherein:

said first member comprises a vehicle hood; and said second member comprises a vehicle body.

14. The method as set forth in claim 3, further comprising the step of:

providing said block member and said plate member with means defining a plurality of discrete positions at which said block member can be selectively adjustably positioned with respect to said plate member.

15. The method as set forth in claim 14, further comprising the steps of:

providing a plurality of flexible blade detents upon said plate member; and providing a plurality of notches upon said block member for selectively engaging said flexible blade detents of said plate member, whereby said plurality of flexible blade detents and said plurality of notches together comprise said means defining said plurality of discrete adjustable positions for said block member with respect to said plate member.

16. The method as set forth in claim 15, further comprising the step of:

providing fastening means interconnecting said block member and said plate member for fixedly securing said block member to said plate member at a selected one of said adjustable positions of said block member with respect to said plate member after said block member has been moved to said selected one of said plurality of discrete adjustable positions with respect to said plate member.

17. The method as set forth in claim 3, further comprising the step of:

providing said gripping means with a frangible section whereupon after adjustment of said block member with respect to said plate member, said gripping means may be severed from said block member at said frangible section.

18. The method as set forth in claim 3, wherein:

said first member comprises a vehicle body; and said second member comprises a vehicle hood.

* * * * *